Jan. 20, 1970   R. A. PETERSEN   3,490,457
CATHETER
Filed Feb. 6, 1967
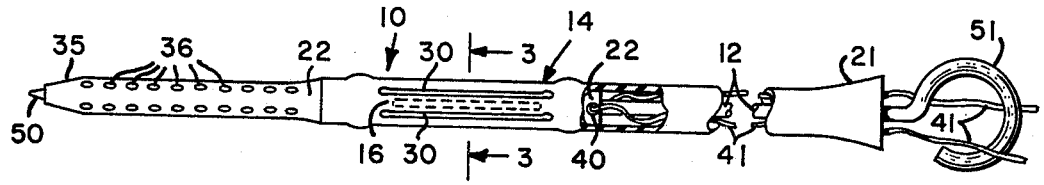
FIG. 1
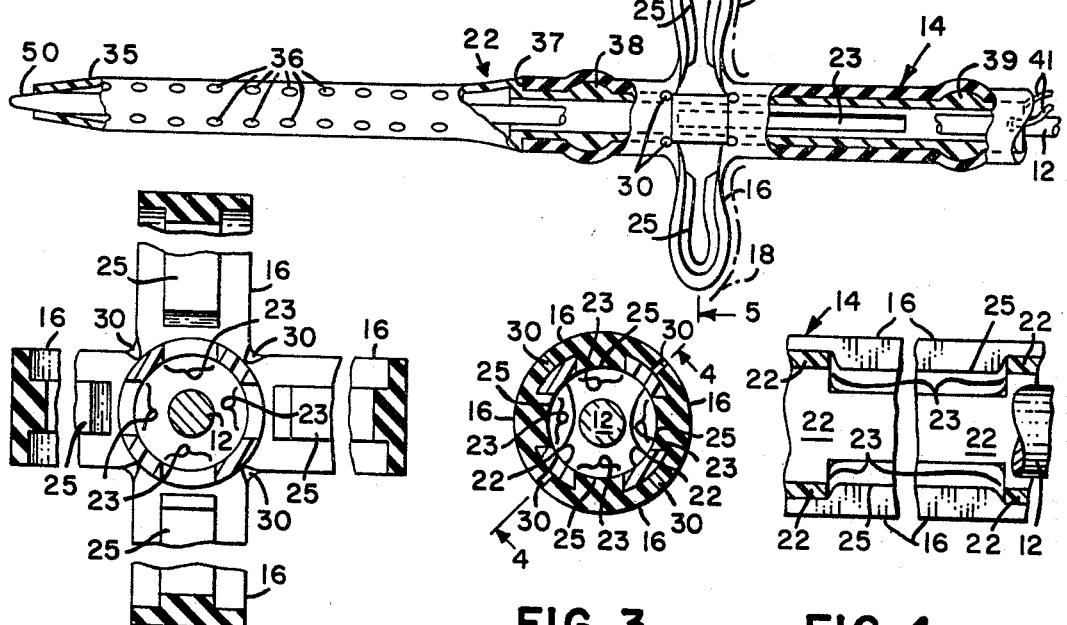
FIG. 2
FIG. 5   FIG. 3   FIG. 4
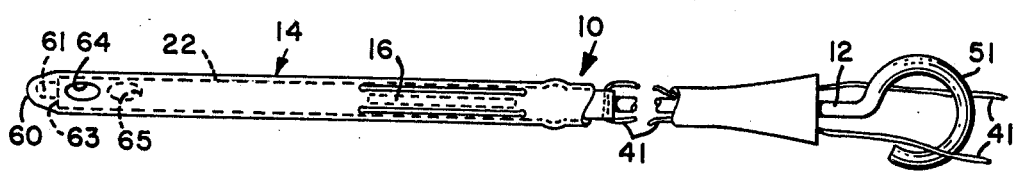
FIG. 6
INVENTOR.
ROY A. PETERSEN
BY
*Jack M. Wiseman*
ATTORNEY

United States Patent Office 3,490,457
Patented Jan. 20, 1970

3,490,457
CATHETER
Roy A. Petersen, 1685 Westwood Drive,
San Jose, Calif. 95125
Filed Feb. 6, 1967, Ser. No. 614,113
Int. Cl. A61m 25/00
U.S. Cl. 128—349                              5 Claims

ABSTRACT OF THE DISCLOSURE

The present invention relates to a catheter which is insertable into the bladder or other body cavity through a small opening. When the catheter is in place, a thin, elastic outer sleeve is flexed to fold out a set of radially projecting wings, which prevent the catheter from slipping out of position when in use.

---

The present invention relates to catheters suitable for insertion into the urinary bladder or other body cavity.

Presently, there are two prevalent techniques for inserting a catheter into the urinary bladder. One technique is to insert the catheter through the urethra. Another technique is to insert the catheter directly through the suprapubic area. Suprapubic insertion may be with an incisional insertion or a punch technique using a trocar. Such an insertion is made either by major surgery requiring the use of a regional or general anesthesia, or by means of a large hollow trocar puncturing device. A trocar used in this manner must be larger in diameter than the catheter, since the catheter is passed through the lumen or passageway thereof. Because of its size, it is difficult to pass the trocar into the bladder. Also, since the hole left by the trocar in the bladder is larger than the diameter of the catheter, urine may leak around the catheter and cause an infection.

Thus, there is a need in puncture insertions for a catheter device which can be inserted through a small body opening and, yet, which is relatively free from slipping out of position when in use. Heretofore, no such device has been available which is adaptable for puncture techniques and provides positive means for preventing the catheter from slipping out of the bladder or other body cavity. Prior devices with a fixed external diameter were limited with respect to their luminal diameter, since part of the lumen was used to accommodate passageways for inflating catheter retaining bags. Self retaining catheters with inflatable balloons are not suitable for direct punch insertion, since the inflatable retaining bags resist passage through small incisions and tend to gather. Generally speaking, the present invention overcomes these and other limitations in the prior art by the provisions of a thin catheter having a smooth outer surface for insertion and removal, with said surface being adapted to open up into radially projecting extensions or wings which lock the catheter inside the body cavity after insertion.

These and other features and advantages of the present invention will become more apparent upon a consideration of the following description taken in connection with the accompanying drawing, wherein:

FIG. 1 is a fragmentary elevational view with a portion thereof broken away of a punch-inserted suprapubic bladder catheter embodying the present invention, which is shown in the closed position. The closed position is used for inserting the catheter into or for removing the catheter from the body.

FIG. 2 is an enlarged fragmentary elevational view partially in section of the catheter of FIG. 1, shown in the open or locked position used when the catheter is inserted in the body.

FIG. 3 is a cross-sectional view taken along line 3—3 in FIG. 1.

FIG. 4 is a cross-sectional view taken along line 4—4 in FIG. 3.

FIG. 5 is a cross-sectional view taken along line 5—5 in FIG. 2.

FIG. 6 is a fragmentary elevational view of a urethral-inserted bladder catheter embodying the present invention, which is shown in the closed position. The closed position is used when the catheter is inserted into and removed from the body.

FIGS. 1 through 5 show a catheter 10, particularly useful for suprapubic punch insertion. For this purpose, the catheter 10, in the closed position shown in FIG. 1, is inserted through the skin with the aid of a central rod or obturator 12. After the catheter 10 is in place, in the bladder of a person's body, a thin elastic outer sleeve 14 of the catheter is flexed to fold out a set of radially projecting wings 16, as shown in FIG. 2, to thereby engage the inner wall of the bladder (shown by phantom line 18) and prevent the catheter from slipping out. When reference is made herein to a closed position for the catheter 10, it is intended that the radial wings 16 be in the retracted position. When the radially projecting wings 16 are in the radially outward projecting position, the catheter 10 is restrained from slipping out of the bladder.

The elastic sleeve 14, which may be made of rubber or other elastomer, such as soft plastic, is flared at the rear end 21 thereof to accommodate standard catheter connectors. At the forward end, the sleeve 14 snugly fits over an insert tube 22 which is made from a semi-rigid plastic material, such as polyethylene. The insert tube 22 contains four longitudinally extending slots 23 cut through the wall thereof, said slots being disposed in quadrature relationship (see FIG. 3). The sleeve 14 has thickened wall portions forming four inwardly directed ribs 25 which fit inside of the respective slots 23. As seen in FIG. 4, the total thickness of the wall of sleeve 14 at the thickened portions 24 is equal to the non-thickened wall thickness plus the thickness of the wall of insert tube 22. Thus, when the catheter is in the closed position, the outer surface of the catheter 10 and the surface of the inner bore through which the obturator 12 is inserted are both smooth and continuous.

The folding wings 16 of the sleeve 14 are formed by means of four thin, longitudinally extending slots 30 extending through the outer sleeve 14, said slots being positioned between the slots 23 in the insert tube 22 (see FIGS 1 and 3). The ribs 25 are positioned in the middle of the wings 16 and are about one-half the width of the wings. Typically, the unthickened part of sleeve 14 is 0.5 mm., the rib extensions 25 are an additional 0.5 mm. in thickness, and the dimensions of the wings 16 are 20 mm. long by 3 mm. wide.

In the embodiment of FIGS. 1 through 5, the forward end of the insert tube 22 is formed with a tip 35 which has a plurality of small holes 36 in order to strain fragments of tissue and blood from fluids drained through the catheter. In the procedure referred to as transurethral prostatic resection, a continuous stream of water enters the bladder through a resection instrument which cleans away resected fragments of the prostrate and accumulated blood. The openings 36 in the tip 35 permit the drainage of fluids while preventing any obstruction to the drainage which may be caused by such fragments collecting in the tube 22.

The rear end of the tip 35 flares out and then drops down sharply to form an annular shoulder 37 for receiving the forward end of the sleeve 14 (see FIG. 2). The height of the shoulder 37 is equal to the thickness of the sleeve 14 so that a continuous even outside surface is formed at the junction between the sleeve 14 and the tip 35. Rearward of the sharp shoulder 37, slightly-raised rounded annular shoulders 38 and 39 are formed on the insert tube 22, one on each side of the wings 16. The increased friction between the outer sleeve 14 and the insert tube 22 at the shoulders 38 and 39 prevents the insert tube 22 from slipping out of the sleeve 14 and also retains the wings 16 in the extended position once they are opened up. Diametrically opposed holes 40 are formed in the wall of the insert tube 22 near the rear end thereof; and a strong traction thread or line 41 is disposed through the holes 40 and passes out the rear end 21 of the outer sleeve 14.

The obturator 12, which may be formed of a stainless steel rod, fits tightly inside of the insert tube 22. The forward end is sharpened into a conical tip 50 with the same slope as the catheter tip 35. The end of the catheter tip 35 is cut off so that the obturator tip 50 extends slightly beyond the catheter. This tip 50 bears the pressure of the advancing catheter, as described subsequently. The rear end of the obturator is formed into a loop type handle 51. Alternatively, a separate handle may be affixed at this end.

The procedure for using the catheter of FIGS. 1 through 5 in the urinary bladder will now be described. With the urinary bladder tightly inflated, a small slit is made in the skin and rectus fascia above the symphisis pubis over the inflated bladder. The closed catheter 10 with obturator 12 in place, as shown in FIG. 1, is advanced through the incised skin and rectus fascia and into the bladder by downward pressure on, and a rotating motion of, the obturator 12. In a typical embodiment, the outer sleeve 14 is 6 mm. in diameter and the required size of the incision slit is only 2 cm. With the obturator 12 still in place, upward traction is put on the strings 41 while downward pressure is exerted on the elastic sleeve 14. This causes the wings 16, formed in the surface of sleeve 14, to flex and open inside the bladder as shown in FIG. 2. The retaining shoulders 38 and 39 of insert 22 hold the wings 16 in the extended position. The ribs 25 strengthen the wings 16 and enhance their capacity in this open position to retain the drainage tip 35 inside the bladder in use, regardless of the pressure which builds up in the bladder. The obturator 12 and the strings 41 are then removed from the catheter. When it is desired to remove the catheter, the obturator 12 is re-inserted and downward pressure is placed on the obturator while pulling up on the elastic sleeve 14. This closes the wings 16 and permits the catheter 10 to be easily withdrawn from the body. In view of the inexpensive construction of this catheter, it is practical to dispose of same after a single use.

FIG. 6 shows a catheter 10 modified so as to be suitable for urethral insertion. It differs from the structure of FIGS. 1 through 5 only in the details of the drainage tip. The forward end of the outer sleeve 14 is closed by a rounded tip 60 which receives a rounded tip 61 provided on the obturator 12. The plastic insert 22 has a flat forward end 63 and drainage holes 64 and 65 extend through the outer sleeve 14 and the insert tube 22, respectively. The catheter of FIG. 6 is inserted in the bladder through the urethra and then the wings 16 are extended, as described with reference to FIGS. 1 through 5, to prevent the catheter from slipping out. To remove the catheter, the wings 16 are closed or retracted also as described with reference to FIGS. 1 through 5.

The catheter of the present invention is particularly suitable for being entirely constructed from inert materials, such as silicon rubber and inert plastic materials, because of its ability to obviate the need of a balloon or the like.

Having thus described my invention, what I claim as new and desire to protect by Letters Patent is:

1. A catheter comprising: a flexible outer sleeve; said outer sleeve being formed with extendible members, said extendible members forming a smooth surface with the adjacent portion of said sleeve for purposes of insertion and removal of the catheter; means for flexing said sleeve, said means causing said extendible members to project outwardly from said sleeve for restraining the adjacent portions of the catheter from slipping out of a body in which it is inserted, and an insert tube with longitudinal slots on the outer surface thereof, said outer sleeve being fitted over said insert tube, said outer sleeve having longitudinally extending ribs which project radially outward from the inside surface of said sleeve and fit inside said slots.

2. A catheter according to claim 1 wherein said outer sleeve has a plurality of circumferentially-spaced, longitudinally-extending slots radially extending therethrough, said insert tube slots and said inwardly-projecting ribs being circumferentially positioned between said sleeve slots, and said sleeve flexing means including means for moving said outer sleeve relative to said tube whereby the portions of said sleeve slots flex and become radially-projecting.

3. A catheter according to claim 2 wherein said insert tube is adapted to have a line attached to the rear end thereof so that said sleeve may be flexed open by pulling up on said line while pushing down on said sleeve.

4. A catheter according to claim 2 and comprising an annular, slightly raised portion on the outer surface of said insert tube, the friction between said raised portion and said sleeve serving, after said sleeve has been flexed, to retain said flexed sleeve portions in the radially projecting position.

5. A catheter as claimed in claim 1 and comprising a movable rod inserted in said insert tube for the insertion and removal of the catheter.

References Cited

UNITED STATES PATENTS

| 2,649,092 | 8/1953 | Wallace | 128—349 |
| 3,241,554 | 3/1966 | Coanda | 128—350 |
| 3,397,699 | 8/1968 | Kohl | 128—349 |

FOREIGN PATENTS

| 688,450 | 3/1953 | Great Britain. |
| 955,490 | 4/1964 | Great Britain. |

CHARLES F. ROSENBAUM, Primary Examiner